(12) United States Patent
Kilpatrick

(10) Patent No.: US 9,792,526 B2
(45) Date of Patent: Oct. 17, 2017

(54) AUTOMATIC IDENTIFICATION OF CHANGES IN OBJECTS

(71) Applicant: CHARTER COMMUNICATIONS OPERATING, LLC, St. Louis, MO (US)

(72) Inventor: Thomas M. Kilpatrick, Southlake, TX (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 0 days.

(21) Appl. No.: 14/633,217

(22) Filed: Feb. 27, 2015

(65) Prior Publication Data

US 2016/0253576 A1    Sep. 1, 2016

(51) Int. Cl.
*G06K 9/62*    (2006.01)
*G06K 9/00*    (2006.01)
*G06T 7/00*    (2017.01)

(52) U.S. Cl.
CPC ....... *G06K 9/6215* (2013.01); *G06K 9/00771* (2013.01); *G06K 9/6202* (2013.01); *G06T 7/001* (2013.01); *G06T 2207/30236* (2013.01); *G06T 2207/30252* (2013.01)

(58) Field of Classification Search
CPC ....... A61B 2019/5265; G06K 2209/21; G06K 9/00771; G06K 9/00785; G06K 9/6203; G06K 9/6204; G06K 9/6878; G06T 7/20; G06T 7/2033; G06T 7/2006; G06T 7/204; G06T 7/2046; G06T 7/2053; G06T 7/2093; G08B 13/19602; G08B 13/19604

USPC .................................................. 382/103, 105
See application file for complete search history.

(56) References Cited

U.S. PATENT DOCUMENTS

| | | | | |
|---|---|---|---|---|
| 2006/0114531 A1* | 6/2006 | Webb | ................. | G01N 21/8806 359/15 |
| 2013/0336554 A1* | 12/2013 | Lewis | ................. | G06K 9/00771 382/128 |
| 2013/0343621 A1* | 12/2013 | Wilson | .................. | G06T 11/001 382/128 |
| 2015/0049914 A1* | 2/2015 | Alves | .................... | G06K 9/3258 382/105 |
| 2016/0078704 A1* | 3/2016 | Phillips | .............. | G06K 9/00771 340/568.1 |
| 2016/0171312 A1* | 6/2016 | Aoki | ...................... | G08G 1/015 382/105 |

FOREIGN PATENT DOCUMENTS

FI    WO 0146668 A1 *   6/2001   .............. G01N 21/88

* cited by examiner

*Primary Examiner* — Siamak Harandi
*Assistant Examiner* — Narek Zohrabyan
(74) *Attorney, Agent, or Firm* — Meagher Emanuel Laks Goldberg & Liao, LLP

(57) ABSTRACT

The specification and drawings present a new method, apparatus and software related product (e.g., a computer readable memory or a storage device) for automatic timely finding of deficiencies in objects such as automobiles, railcar, airplane tractor trailer, intermodal containers and the like, by automatically monitoring the object's appearance changes while they are moving in a course of normal operation using their camera pictures/images, e.g., during passing through a check point.

12 Claims, 3 Drawing Sheets

AUTOMATIC IDENTIFICATION OF CHANGES IN OBJECTS

FIELD OF THE INVENTION

The invention relates to monitoring a condition of objects and, more particularly but not exclusively, optimization of timely finding deficiencies in objects such as automobiles, railcar, airplane and the like, by automatically monitoring their appearance changes.

BACKGROUND

For large fleets (trucking/shipping companies, police departments, postal service, cable/telephone companies, etc.) it may be extremely difficult (if not impossible) and costly to physically inspect each vehicle/container for possible damages, deficiencies, dirtiness and the like. For example, it may be important to detect on time that the object need a repair (e.g., simply inflating a tire, re-painting and the like), detecting a need for washing the object, detecting unauthorized additions/features on the object, detecting need for proper locks, and the like.

SUMMARY

Various deficiencies in the prior art are addressed by using a method, apparatus and software related product according to embodiments disclosed herein According to a first aspect of the invention, a method, performed by a computing device, the method comprising: storing data for baseline pictures of each of a plurality of objects including a unique identification associated with a corresponding object; receiving further data for pictures of some objects of the plurality of objects taken automatically during movement of the some objects in a course of normal operation; identifying on each taken picture the corresponding object and the unique identification associated with the corresponding object; storing the further data including each received picture and the corresponding identified unique identification for each corresponding object; comparing at least a latest picture of the each object taken during each of one or more predefined time intervals with the corresponding stored baseline picture of the object; and determining whether a difference between the latest picture of the each object and the corresponding stored baseline picture of the each object exceeds a corresponding threshold or a plurality of thresholds set for each of the one or more predefined time intervals.

According further to the first aspect of the invention, the plurality of pictures may be taken using one or more cameras located in a vicinity of the check point. Further the one or more cameras may comprise an array of cameras. The computing device may comprise the one or more cameras or may be a separate.

According further to the first aspect of the invention, the data and the received data may be in a digital form. Further, the received data may indicate for each picture a time the each movable picture is taken during the predefined time interval, so that the storing also include storing a respectful time of taking a corresponding picture of the each object.

Still further according to the first aspect of the invention, the object may be a truck, an airplane, an automobile, a tractor trailer or the object carrying an intermodal container. Further, the unique identification may be a license plate number, a barcode or a radio frequency identification (RFID).

According further to the first aspect of the invention, the method may further comprise: providing, in response to the determining for each of the predefined time intervals, an indication of exceeding one or more of the corresponding thresholds for at least one of the plurality of objects which requires a corrective action or multiple correction actions. Further, the corrective action may comprise one or more of: washing the at least one object, repairing the at least one object, requiring about reporting of the accident involving the at least one object, correcting addition or removal of an unauthorized feature or item from the at least one object, inflating a tire on the at least one object, and installing proper locks on a container on the at least one object. Still further, the indication may be one or more of: a report not requiring any action, a report requiring an action, a sound alarm requiring an immediate action and an urgent e-mail message requiring the immediate action or a further immediate action.

According further to the first aspect of the invention, the one or more predefined time intervals may be one or more of: one hour, one day, one week and one month. Further, the comparing may be performed every hour or every day for an accident indicator. Still further, the one or more predefined time intervals may be overlapping in time.

According further to the first aspect of the invention, the plurality of objects may be associated with a facility, so that each corresponding picture of the object may be automatically taken while entering or exiting the facility.

According further to the first aspect of the invention, the movement of the object at the normal course of business may comprise crossing a check point in any direction.

According to a second aspect of the invention, an apparatus comprising: a processor; a storage medium for tangibly storing thereon program logic for execution by the processor, the program logic comprising: logic to store data for baseline pictures of each of a plurality of objects including a unique identification associated with a corresponding object; logic to receive further data for pictures of some objects of the plurality of objects taken automatically during movement of the some objects in a course of normal operation; logic to identify on each taken picture the corresponding object and the unique identification associated with the corresponding object; logic to store the further data including each received picture and the corresponding identified unique identification for each corresponding object; logic to compare at least a latest picture of the each object taken during each of one or more predefined time intervals with the corresponding stored baseline picture of the object; and logic to determine whether a difference between the latest picture of the each object and the corresponding stored baseline picture of the each object exceeds a corresponding threshold or a plurality of thresholds set for each of the one or more predefined time intervals.

According further to the second aspect of the invention, the program logic may further comprise: logic to provide, in response to the determining for each of the predefined time intervals, an indication of exceeding one or more of the corresponding thresholds for at least one of the plurality of objects which requires a corrective action or multiple correction actions.

According to a third aspect of the invention, a non-transitory computer readable storage medium tangibly storing computer program instructions capable of being executed by a computer processor, the computer program instructions defining code for: storing data for baseline pictures of each of a plurality of objects including a unique identification associated with a corresponding object;

receiving further data for pictures of some objects of the plurality of objects taken automatically during movement of the some objects in a course of normal operation; identifying on each taken picture the corresponding object and the unique identification associated with the corresponding object; storing the further data including each received picture and the corresponding identified unique identification for each corresponding object; comparing at least a latest picture of the each object taken during each of one or more predefined time intervals with the corresponding stored baseline picture of the object; and determining whether a difference between the latest picture of the each object and the corresponding stored baseline picture of the each object exceeds a corresponding threshold or a plurality of thresholds set for each of the one or more predefined time intervals.

Further according to the third aspect of the invention, wherein the computer program instructions may further define code for: providing, in response to the determining for each of the predefined time intervals, an indication of exceeding one or more of the corresponding thresholds for at least one of the plurality of objects which requires a corrective action or multiple correction actions.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
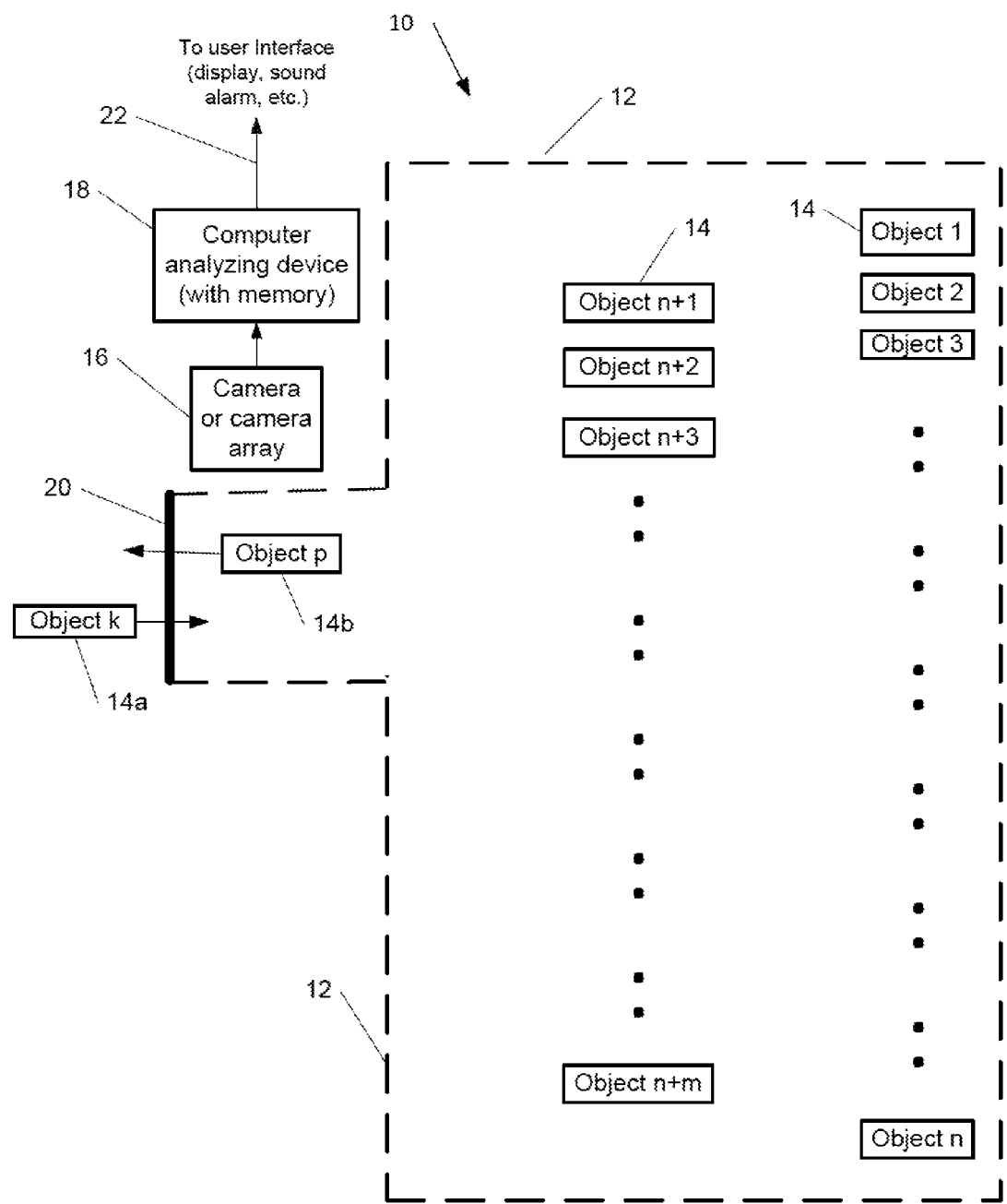
FIG. 1 is a diagram demonstrating an example of a system comprising a facility hosting a plurality of (movable) objects and a camera arrangement near a check point for that facility for practicing embodiments described herein.

A method, apparatus and software related product (e.g., a computer readable memory or a storage device) are presented for automatic timely finding of deficiencies in objects such as automobiles, railcars, airplanes, tractor trailers, intermodal containers and the like, by automatically monitoring the object's appearance changes while they are moving in a course of normal operation using their camera pictures/images, e.g., during passing through a check point.

For example, a bay or an array of one or more cameras can be set up at a fleet facility ("facility" in general) which houses a plurality of objects such as vehicles/containers. Corresponding camera/cameras can automatically take pictures (e.g., digital photos) of each object such as vehicle/container (auto, car, truck, railcar, plane, tractor trailer, intermodal container, etc.) while that object leaves from or comes/arrives back to the facility in a course of normal operation. The vehicle/container can be identified by a license plate, a barcode, a RFID (radio frequency identification) or a similar device. Then each picture (e.g., a digital photograph) may be associated with the identified vehicle/container and stored in a database.

Moreover the digital photos of each vehicle/container can be compared periodically (hourly, daily, weekly, monthly or in a similar fashion) to baseline photos of the corresponding vehicle/container. Using computer analysis it may be possible to evaluate the differences between the most recent photos and the baseline photos and assign for example a percentage score to that comparison with 100% being a perfect match. It is appreciated that a person skilled in the art would recognize the existence of computer capabilities for determining the percentage score/perfect match by comparing photographs (pictures) of the same object, where the pictures of the same object being taken at different times. Further actions in regard to each of the evaluated object may be taken based on the results of the computer analysis using one or more predetermined thresholds and one or more predefined evaluation scale as further discussed herein.

According to one embodiment, a computer device can store in a memory data for baseline pictures of each of a plurality of objects including a unique identification associated with a corresponding object. The baseline pictures may be created and stored in advance when a new object such as a vehicle or a container is assigned to the facility, so that the pictures may show for each object its identification such as license plate, barcode, etc. Also generally the baseline picture may include one or more pictures, comprising at least one picture distinctly showing a selected view such as a front view of the object having the identification clearly seen and other pictures showing different sides of the object such as a back view, side views, etc. Moreover, the object identification can be also stored for each object in addition to the baseline picture(s) of each object.

Furthermore, according to this embodiment, the automatically operated one or more cameras may be configured to take a plurality pictures of objects moving to and/or from the facility during their normal operation, where each of the plurality of pictures being taken during a predefined time interval chosen for performing the comparison with the baseline pictures. Then according to this embodiment, the computer device can continuously receive further data corresponding to the plurality of pictures taken by the camera/cameras of the objects during their movement to/from the facility (e.g., while crossing a check point by an object in any direction while operated during a normal course of business). It is noted that the one or more cameras may be a part of the computing device or may be an independent entity.

Moreover, upon receiving the further data, the computing device can identify the corresponding object on each received picture using the unique identification associated with the corresponding object, the identification being visible in the corresponding picture. The received further data for a corresponding picture of each corresponding object can be stored with the identified unique identification.

It is noted that in one embodiment, it may not be necessary to store all the further data received. In such embodiment when the latest picture of a particular object is received, it is analyzed as explained above and then saved while the previously saved data for the previous picture of this particular object may be deleted, if the analysis for all predefined time intervals which include the previous picture has been already performed.

At the end of a predefined time interval during which the further data is collected the computing device can perform a comparison for the each object, by comparing at least the latest picture of the each object taken during the predefined time interval with the corresponding stored baseline picture of the object showing the same portion of the object (e.g., front side, back side, right side, left side, etc.) as the latest picture. As a result of this comparison for each of the compared objects, the computer device can determine whether a difference between the latest picture of the each object taken during the predefined time interval and the corresponding stored baseline picture of the object exceeds a threshold or a plurality of thresholds set for the predefined time interval as further explained herein.

According to a further embodiment, in general it can be one or more predefined time intervals set up such that each predefined time interval having corresponding one or more thresholds. The one or more predefined time intervals may be overlapping in time. Then at the end of each of the one or more predefined time intervals this comparison may be performed as explained above using corresponding threshold or a plurality of thresholds for each of the one or more predefined time intervals independently. It is further noted that multiple thresholds set for the same predefined time interval may corresponds to different required actions. Also it can be possible that if the only one threshold set for one predefined time interval is exceeded, this may require multiple actions.

In response to the determining a difference between the latest picture of the each object taken during the each of the predefined time intervals and the corresponding baseline picture, an indication of exceeding one or more predetermined thresholds for at least one of the plurality of objects may be provided which can require one or more corrective actions. For example, the indication may be a sound alarm and/or an urgent e-mail message. In general though, the indication may be one or more of: a report not requiring any action, a report requiring an action, a sound alarm requiring an immediate action and an urgent e-mail message requiring this immediate action or a further immediate action.

The greater the difference from the baseline photos determined by the comparison described herein, the greater the change in the vehicle/container may be. The indication for a required/recommended action may include (but is not limited to) the following options:

the object needs to be washed;
the object has been in an accident and requires repair; the action may further include checking whether the accident has been properly reported by the driver; for example, an email could be generated to the responsible supervisor to determine if the reporting had taken place;
something unauthorized has been added to or removed from the object; for example, the following unauthorized violation may be detected:
  presence of bumper stickers/decals not authorized by the owner,
  ladder rack being added or removed,
  air compressor or other tools being removed, graffiti being present,
  presence of a device for terrorist purposes such as a bomb on an intermodal container and
  locks being removed from container doors;
tire wear or a need for inflating a tire being detected.

Thus, according to an embodiment described herein, different predetermined one or more thresholds for the difference (between the latest picture of the each object taken during the predefined time interval and the corresponding stored baseline picture) for each of the one or more predefined time intervals can be established for each specific application (e.g., fleet facility).

In other words, the sensitivity (percentage of differences or predetermined thresholds) would be individualized for each installation and reports produced meeting the desired criteria for someone to take the necessary corrective action. The degree of a photo difference could also determine the report frequency: for example a washing indicator might come out monthly but not every month with the predefined time interval of one month.

On the other hand, an accident indicator could be set very quickly, i.e., the same day or within an hour with the predefined time interval set to be one day or one hour. In other words, the comparison with baseline picture may be set to "every day" or "every hour" just to make sure that the object was not involved in an accident recently, whereas other less urgent maintenance issues (like washing, cleaning, small non-essential repair) may be set to be checked in longer periods of time, such as one week, one month, etc.

FIG. 1 shows a non-limiting example of a system 10 comprising a facility (fleet facility) 12 with a plurality of objects 14 (objects like trucks, buses, cars, tractor trailers, etc.), which are based and parked at the facility 12 in two rows: the first row housing objects 1 through n (n being a finite integer), and a second row housing objects n+1 through n+m (m being a finite integer, m>n). The facility 12 has a check point 20 through which the objects can enter or leave the facility 12. For example in FIG. 1, the object k (14a) is entering the facility 12 and an object p (14b) is leaving the facility 12. A camera or a camera array 16 can automatically detect any of the objects approaching to and passing through the check point 20 and automatically take one or more pictures of each of the passing objects k and p. According to an embodiment, the one or more pictures for each of the objects k or p may include one image/picture or a combination of images of its front side, back side, right side, left side, etc., which can be a preset procedure. For example, it can be set taking front and back pictures of each of the object 14a and 14b. Alternatively in could be set to take just one picture (e.g., back side) displaying the identification of the object.

The further data generated by the camera/camera array 16 is provided to a computer analyzing device (computing device) 18 to perform analysis as described above. The computing device can periodically send at the end of each of the predefined time interval one or more of: a report (status report) not requiring any action, a report (status report) requiring an action, a sound alarm requiring an immediate action and an urgent e-mail message requiring this immediate action or a further immediate action.

Figure 2:
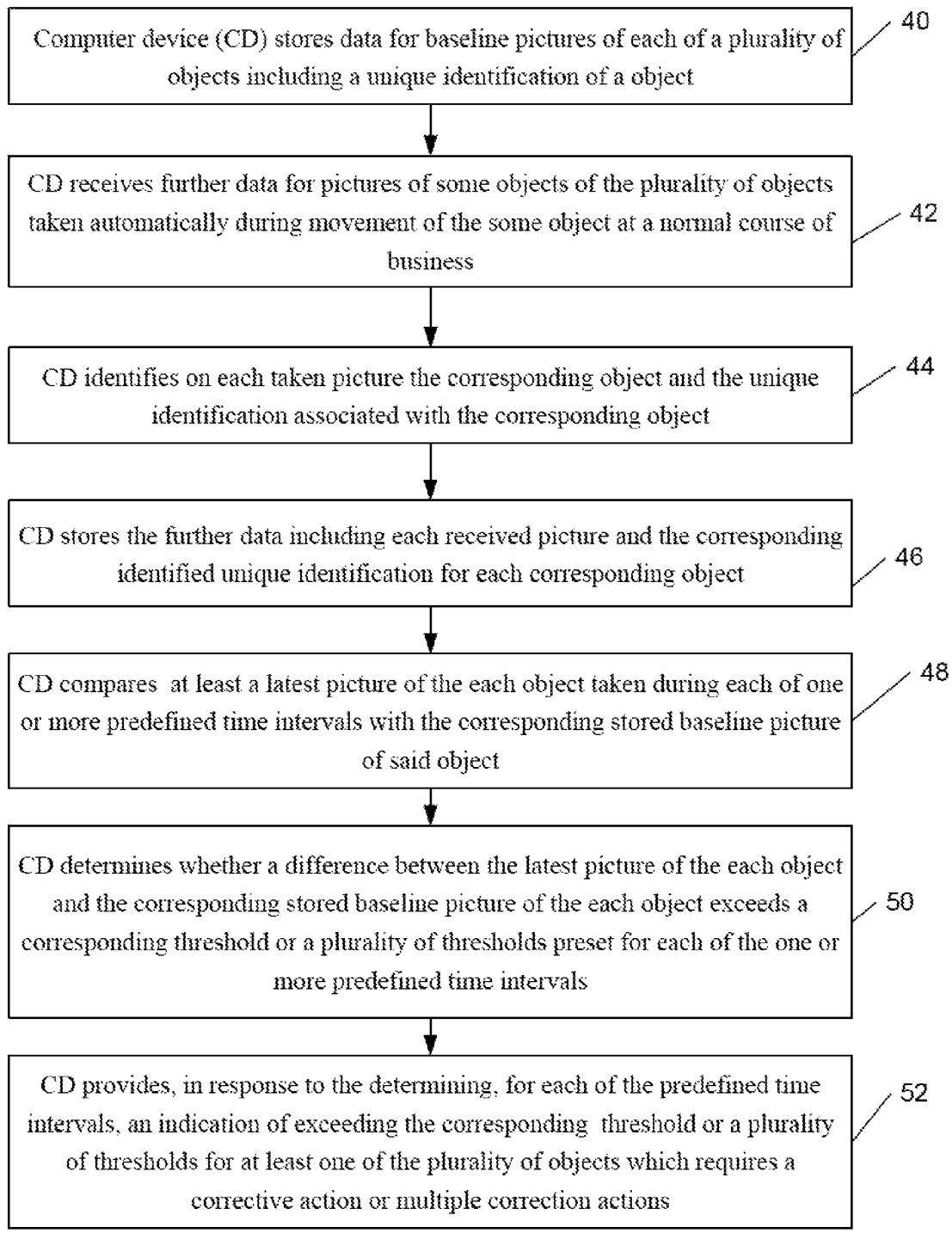
FIG. 2 is a flow chart demonstrating implementation by a computing device of an embodiment described herein.

With reference now to FIG. 2, shown is an exemplary flow chart demonstrating implementation of one embodiment by a computing device (e.g., the device 18 in FIG. 1 or the device 300 in FIG. 3), as described herein. It is noted that the order of steps shown in FIG. 2 is not required, so in principle, the various steps may be performed out of the illustrated order. Also certain steps may be skipped, different steps may be added or substituted, or selected steps or groups of steps may be performed in a separate application following the embodiments described herein.

Figure 3:
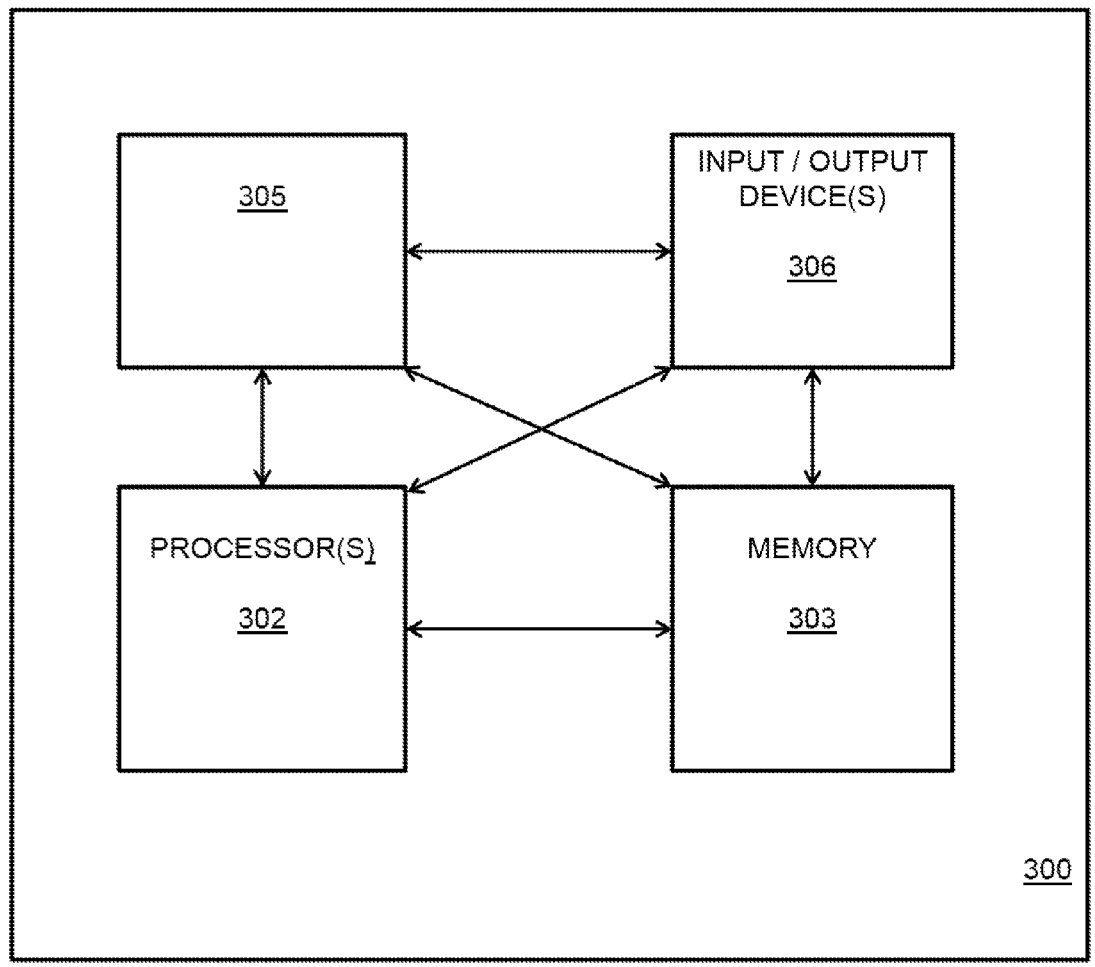
FIG. 3 is a high-level block diagram of a computer suitable for performing various embodiments described herein.

In a method according to the embodiment shown in FIG. 2, in a first step 40, a computing device (CD) such as the device 18 in FIG. 1 or the device 300 in FIG. 3, stores data for baseline pictures of each of a plurality of objects including a unique identification of an object.

In a next step 42 the CD receives further data for pictures of some objects of the plurality of objects taken automatically during movement of the some objects at a normal course of business (normal operation).

In a next step 44, the CD identifies on each taken picture the corresponding object and the unique identification associated with the corresponding object.

In a next step 46, the CD stores the further data including each received picture and the corresponding identified unique identification for each corresponding object.

In a next step 48, the CD compares at least a latest picture of the each object taken during each of one or more predefined time intervals with the corresponding stored baseline picture of the object.

In a next step 50, the CD determines whether a difference between the latest picture of the each object and the corresponding stored baseline picture of the each object exceeds a corresponding threshold or a plurality of thresholds preset for each of the one or more predefined time interval.

In a next step 52, the CD provides for each of the predefined time intervals (in response to the determining) an indication of exceeding the corresponding threshold a plurality of thresholds for at least one of the plurality of objects which requires a corrective action or multiple corrective actions.

FIG. 3 depicts a high-level block diagram of a computing device 300 suitable for use in performing various functions described herein with respect to the disclosed embodiments, such as those associated with device 18 as described above with respect to FIG. 1. FIG. 3 is a simplified block diagram of a computing/electronic device that is suitable for practicing the exemplary embodiments of this invention, and a specific manner in which components of the device are configured to cause that device to operate.

As depicted in FIG. 3, computer (computing device) 300 includes a processor element 303 (e.g., a central processing unit (CPU) and/or other suitable processor(s)), a memory 304 (e.g., random access memory (RAM), read only memory (ROM), and the like), a cooperating module/process 305, and various input/output devices 306 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like).

It will be appreciated that the functions depicted and described herein may be implemented in hardware and/or in a combination of software and hardware, e.g., using a general purpose computer, one or more application specific integrated circuits (ASIC), and/or any other hardware equivalents. In one embodiment, the cooperating process 305 can be loaded into memory 304 and executed by processor 302 to implement the functions as discussed herein. Thus, cooperating process 305 (including associated data structures) can be stored on a computer readable storage medium, e.g., RAM memory, magnetic or optical drive or diskette, and the like.

It will be appreciated that computing device 300 depicted in FIG. 3 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods and/or techniques described herein are invoked or otherwise provided. Instructions for invoking the inventive methods may be stored in tangible and non-transitory computer readable medium such as fixed or removable media or memory, and/or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

The various embodiments contemplate an apparatus configured to provide functions in accordance with the various embodiments, the apparatus comprising a processor and a memory communicatively connected to the processor, the processor configured to perform these functions as described above with respect to the various figures.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method for automatically monitoring a plurality of vehicles based at a facility, comprising:

storing, via a computing device, baseline picture data comprising baseline pictures of each of the plurality of vehicles based at the facility, the baseline picture data including a unique identification associated with a corresponding vehicle;

receiving, from one or more cameras located at a check point providing vehicle ingress or egress of the facility and configured to take pictures of vehicles moving therethrough, further picture data comprising pictures of vehicles taken automatically during movement of the vehicles through the check point;

identifying on each taken picture the corresponding vehicle and the unique identification associated with the corresponding vehicle;

storing, via the computing device, the received further pictured data including the taken pictures and corresponding unique identification of the vehicles;

comparing at least a latest picture of each vehicle taken during each of one or more predefined time intervals with the corresponding stored baseline picture of the vehicle;

determining whether a difference between at least the latest picture of the each vehicle and the corresponding stored baseline picture of the each vehicle exceeds either of a maintenance related threshold level and an accident related threshold level set for each of the one or more predefined time intervals; and providing, in response to a determination that either of the maintenance related and accident related threshold levels have been exceeded, indication of a corresponding vehicle requiring a maintenance or accident related corrective action.

2. The method of claim 1, wherein said one or more cameras comprise an array of cameras.

3. The method of claim 1, wherein the accident related corrective action comprises one or more of:
requiring repair of the vehicle; and
determining whether accident related information has been reported.

4. The method of claim 1, wherein the received picture data indicates for each picture a time the picture is taken during the predefined time interval, so that the storing also includes storing a respectful time of taking a corresponding picture of the each object.

5. The method of claim 1, wherein the vehicle comprises a truck, an airplane, an automobile, a tractor trailer or a vehicle carrying an-intermodal container.

6. The method of claim 1, wherein the maintenance related corrective action comprises one or more of:
washing the vehicle,
repairing the vehicle,
correcting addition of an unauthorized feature or item to the vehicle,
correcting removal of an authorized feature or item from the vehicle,
inflating a tire on the vehicle, and
installing a lock on a container on the vehicle.

7. The method of claim 1, wherein said indication is one or more of:
a report not requiring any action, a report requiring an action, a sound alarm requiring an immediate action and an urgent e-mail message requiring said immediate action or a further immediate action.

8. The method of claim 1, wherein the unique identification is a license plate number, a barcode or a radio frequency identification (RFID).

9. The method of claim 1, wherein the one or more predefined time intervals are one or more of: one hour, one day, one week and one month.

10. The method of claim 1, wherein the further picture data comprising pictures of vehicles taken automatically during either or both of vehicle ingress and vehicle egress of the facility.

11. An apparatus comprising:
a processor;
a storage medium for tangibly storing thereon program logic for execution by the processor, the program logic comprising:
logic to store baseline picture data comprising baseline pictures of each of the plurality of vehicles based at the facility, the baseline picture data including a unique identification associated with a corresponding vehicle;
logic to receive from one or more cameras located at a check point providing vehicle ingress or egress of the facility and configured to take pictures of vehicles moving therethrough, further picture data comprising pictures of vehicles taken automatically during movement of the vehicles through the check point;
logic to identify on each taken picture the corresponding vehicle and the unique identification associated with the corresponding vehicle;
logic to store the received further pictured data including the taken pictures and corresponding unique identification of the vehicles;
logic to compare at least a latest picture of each vehicle taken during each of one or more predefined time intervals with the corresponding stored baseline picture of the vehicle;
logic to determine whether a difference between at least the latest picture of the each vehicle and the corresponding stored baseline picture of the each vehicle exceeds either of a maintenance related threshold level and an accident related threshold level set for each of the one or more predefined time intervals; and
logic to provide in response to a determination that either of the maintenance related and accident related threshold levels have been exceeded, indication of a corresponding vehicle requiring a maintenance or accident related corrective action.

12. A non-transitory computer readable storage medium tangibly storing computer program instructions capable of being executed by a computer processor, the computer program instructions defining code for:
storing, via a computing device, baseline picture data comprising baseline pictures of each of the plurality of vehicles based at the facility, the baseline picture data including a unique identification associated with a corresponding vehicle;
receiving, from one or more cameras located at a check point providing vehicle ingress or egress of the facility and configured to take pictures of vehicles moving therethrough, further picture data comprising pictures of vehicles taken automatically during movement of the vehicles through the check point;
identifying on each taken picture the corresponding vehicle and the unique identification associated with the corresponding vehicle;
storing, via the computing device, the received further pictured data including the taken pictures and corresponding unique identification of the vehicles;
comparing at least a latest picture of each vehicle taken during each of one or more predefined time intervals with the corresponding stored baseline picture of the vehicle;
determining whether a difference between at least the latest picture of the each vehicle and the corresponding stored baseline picture of the each vehicle exceeds either of a maintenance related threshold level and an accident related threshold level set for each of the one or more predefined time intervals; and
providing, in response to a determination that either of the maintenance related and accident related threshold levels have been exceeded, indication of a corresponding vehicle requiring a maintenance or accident related corrective action.

* * * * *